United States Patent [19]

Itoh et al.

[11] Patent Number: 4,707,503

[45] Date of Patent: Nov. 17, 1987

[54] RADIATION-CURABLE ORGANOPOLYSILOXANE COMPOSITIONS

[75] Inventors: Kunio Itoh; Fumio Okada; Yasushi Yamamoto; Hisashi Aoki, all of Gunma, Japan

[73] Assignee: Shin-Etsu Chemical Co., Ltd., Tokyo, Japan

[21] Appl. No.: 800,087

[22] Filed: Nov. 21, 1985

Related U.S. Application Data

[63] Continuation of Ser. No. 607,669, May 7, 1984, abandoned.

[30] Foreign Application Priority Data

May 10, 1983 [JP] Japan .................................. 58-81360

[51] Int. Cl.$^4$ ...................... C08G 75/04; C08G 77/28
[52] U.S. Cl. ........................................ 522/99; 528/30; 528/32; 556/427; 524/866
[58] Field of Search ............................. 522/99; 528/30

[56] References Cited

U.S. PATENT DOCUMENTS

| | | | |
|---|---|---|---|
| 3,350,437 | 10/1967 | Simmler et al. | 528/30 |
| 3,767,690 | 10/1973 | Speier | 528/30 |
| 3,816,282 | 6/1974 | Viventi | 204/159.13 |
| 4,290,869 | 9/1981 | Pigeon | 204/159.13 |
| 4,359,369 | 11/1982 | Takamizawa | 528/30 |

Primary Examiner—Melvin I. Marquis
Assistant Examiner—A. H. Koeckert
Attorney, Agent, or Firm—Jules E. Goldberg

[57] ABSTRACT

The radiation-curable organopolysiloxane composition of the invention is quite free from the problem of the migration of silicone toward the surface of a body in contact with the surface of the cured film of the composition even by curing with an extremely small dose of radiation, e.g. ultraviolet light and electron beams, for curing. The mechanism for curing is in principle the radiation-induced addition reaction between the aliphatically unsaturated bonds in a first organopolysiloxane and the mercapto groups in a second organopolysiloxane but the aliphatically unsaturated bond in the first organopolysiloxane is bonded preferably remotely from the silicon atom with an electron-attractive atom or group intervening therebetween such as the divalent groups of the formula $-O\text{-}(CH_2)_2S-$ and $-CH_2-O-CH_2-S-$.

6 Claims, No Drawings

RADIATION-CURABLE ORGANOPOLYSILOXANE COMPOSITIONS

This is a continuation of application Ser. No. 607,669 filed May 7, 1984, now abandoned.

BACKGROUND OF THE INVENTION

The present invention relates to a radiation-curable organopolysiloxane composition or, more particularly, to a radiation-curable organopolysiloxane or silicone composition which provides a coating layer on a substrate surface fully cured by irradiation with actinic rays to be freed from the problem of surface migration of the silicone.

Conventionally, several types of organopolysiloxane compositions are known as those curable by irradiation with actinic rays. They include, for example, the compositions curable by the mechanism of the addition reaction induced by the irradiation with light between an organopolysiloxane having vinyl groups bonded to the silicon atoms and an organohydrogenpolysiloxane having hydrogen atoms directly bonded to the silicon atoms disclosed in Japanese Patent Kokai No. 47-32072 and No. 53-48198 and the compositions curable by the reaction in the presence of a photosensitizer between an organopolysiloxane having mercapto groups bonded to the silicon atoms and an organopolysiloxane having vinyl groups bonded to the silicon atoms disclosed in Japanese Patent Publications No. 54-6523 and No. 57-34318 and Japanese Patent Kokai No. 54-48854 and No. 54-50067.

These compositions are, however, not quite satisfactory in properties when they are used in some applications such as the use in release papers because curing of the silicone composition on the surface is sometimes incomplete to cause migration of the silicone toward a body in contact with the silicone-coated surface. That is, there are several disadvantages such as a change of the releasing property in the lapse of time and the migration of the silicone to the layer of the pressure-sensitive adhesive in contact therewith owing to the incomplete cure by the irradiation with light when the composition is used as a very thin coating film applied to the surface of a paper as the substrate of release papers for temporary protection.

Therefore, there have been several proposals with an object to overcome these deficiencies by the improvement of the curability including increase of the content of the functional groups in the organopolysiloxanes and increase of the amount of the photosensitizer compound, but these measures are not profitable because of some disadvantages accompanying thereto including the adverse deterioration of releasing performance and evolution of an unpleasant odor to greatly decrease the practicability of the methods.

SUMMARY OF THE INVENTION

An object of the present invention is therefore to provide a radiation-curable composition of organopolysiloxanes free from the above described disadvantages in the prior art compositions and the composition of the invention comprises:

(A) an aliphatic unsaturation-containing organopolysiloxane composed of
(1) at least two of the organosiloxane units represented by the general unit formula

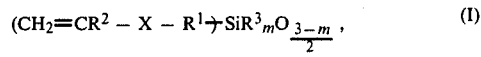

$$(CH_2=CR^2 - X - R^1)\!\!-\!\!SiR^3{}_m O_{\frac{3-m}{2}}, \quad (I)$$

in which $R^1$ is a divalent hydrocarbon group, $R^2$ is a hydrogen atom or a methyl group, $R^3$ is a substituted or unsubstituted monovalent hydrocarbon group, X is a divalent atom or group selected from the class consisting of —O—, —CO—O—, —S—, —O—(CH$_2$)$_2$S— and —CH$_2$—O—CH$_2$—S—, and m is a number of 0, 1 or 2, and (2) optionally, the organosiloxane units represented by the general unit formula

$$R^3{}_n SiO_{\frac{4-n}{2}}, \quad (II)$$

in which $R^3$ has the same meaning as defined above and n is a number of 0, 1, 2 or 3, the molar proportion of the units of the formula (II) being not in excess of 99.9%; and (B) an organosilicon compound having at least two mercapto groups —SH per molecule in such an amount as to provide from 0.01 to 100 moles of the mercapto groups per mole of the unsaturated group $CH_2=CR^2—$ in the component (A).

The above described radiation-curable organopolysiloxane composition of the invention is particularly suitable for curing by ultraviolet irradiation and, when curing of the composition is intended by irradiation with ultraviolet light, the composition should be admixed with a substantial amount of a photosensitizer.

DETAILED DESCRIPTION OF THE PREFERRED EMBODIMENTS

The inventors of the present invention have continued extensive investigations on organopolysiloxane compositions curable by irradiation with actinic rays such as ultraviolet light, high-energy electron beams and the like to arrive at the establishment of the present invention after confirmation of the fact that, in a radiation-curable organopolysiloxane composition comprising an organopolysiloxane having aliphatically unsaturated groups such as vinyl bonded to the silicon atoms and an organopolysiloxane having mercapto groups bonded to the silicon atoms, unexpectedly remarkable improvements can be obtained in the curability of the composition when the aliphatically unsaturated groups are not in direct bonding to the silicon atoms but are bonded remotely to the silicon atoms through an intervening group so as to decrease the adverse effect of steric hindrance around the silicon atom and an electron attractive heteroatom or an organic group containing such an atom is introduced into the vicinity of the unsaturated bond in the aliphatically unsaturated group so that the organopolysiloxane composition is imparted with curability capable of giving a fully cured coating film having a satisfactorily high hardness free from the problem of migration of the silicone toward the surface of the body in contact therewith.

The component (A) in the inventive organopolysiloxane composition is an organopolysiloxane composed of the combination of the organosiloxane units represented by the above given general unit formulas (I) and (II). The group denoted by the symbol $R^1$ in the formula (I) is a divalent hydrocarbon group exemplified by methylene, ethylene, propylene, butylene and phenylene groups, $R^2$ denotes a hydrogen atom or a methyl group and the group denoted by $R^3$ is a substituted or unsubstituted monovalent hydrocarbon group exemplified by alkyl groups such as methyl, ethyl, propyl, butyl, octyl and dodecyl groups, cycloalkyl groups such as cyclopentyl and cyclohexyl groups, aryl groups such as phenyl, tolyl, xylyl and naphthyl groups, alkenyl groups such as vinyl and allyl groups and aralkyl groups such as benzyl and 2-phenylethyl groups as well as those substituted groups obtained by the replacement of a part or all of the hydrogen atoms in the above named hydrocarbon groups with halogen, e.g. chlorine and fluorine, atoms exemplified by chloropropyl, chlorophenyl, dichloropropyl and 3,3,3-trifluoropropyl groups. The symbol X in the formula (I) denotes a divalent atom or group selected from the class consisting of —O—, —CO—O—, —S—, —O-(-CH$_2$-)$_2$S— and —CH$_2$—O—CH$_2$—S—.

Particular examples of the organosiloxane units in conformity with the above definition and suitable in the present invention are as follows, the symbols Me, Vi and Ip each denoting a methyl group, a vinyl group and an isopropenyl group, respectively:
Vi—O—CH$_2$CH$_2$—S-(-CH$_2$-)$_3$SiMeO; Vi—O—CH$_2$CH$_2$—S-(-CH$_2$-)$_3$SiO$_{3/2}$;
Vi—O—CH$_2$CH$_2$—S-(-CH$_2$-)$_3$SiMe$_2$O$_{\frac{1}{2}}$; Vi—CH$_2$—S-(-CH$_2$-)$_3$SiMeO;
Vi—CH$_2$—S-(-CH$_2$-)$_3$SiO$_{3/2}$; Vi—CH$_2$—S-(-CH$_2$-)$_3$SiMe$_2$O$_{\frac{1}{2}}$;
Vi—CO—O-(-CH$_2$-)$_3$SiMeO; Vi—CO—O-(-CH$_2$-)$_3$SiO$_{3/2}$;
Ip—CO—O-(-CH$_2$-)$_3$SiMeO; and Ip—CO—O-(-CH$_2$-)$_3$SiO$_{3/2}$.

The organosiloxane units optionally comprised in the organopolysiloxane as the component (A) in addition to the units represented by the formula (I) are represented by the general unit formula (II) given above in which the symbol $R^3$ has the same meaning as defined for the formula (I). In particular, the group $R^3$ cannot be a vinyl group when n is equal to 3 while there is no such a limitation when n is equal to 1 or 2.

Particular examples of the organosiloxane units in conformity with the general unit formula (II) and suitable in the present invention are as follows denoting a methyl group and a phenyl group with the symbols Me and Ph, respectively: Me$_2$SiO; MeSiO$_{3/2}$; PhMeSiO; PhSiO$_{3/2}$; Ph$_2$SiO; and CF$_3$CH$_2$CH$_2$SiMeO.

The organopolysiloxane as the component (A) is composed of the above described organosiloxane units of the formula (I) or, optionally, of the two types of the organosiloxane units of the formulas (I) and (II) with the proviso that the molar proportion of the organosiloxane units of the formula (II) is 99.9% or smaller and at least two of the organosiloxane units of the formula (I) are contained in a molecule of the organopolysiloxane as the component (A). It is a preferable condition that the organopolysiloxane as the component (A) has a viscosity in the range from 1,000 to 60,000,000 centistokes as measured at 25° C. although the viscosity should be selected adequately in consideration of the workability of the resultant composition used in coating or other applications.

The component (B) in the inventive organopolysiloxane composition, on the other hand, is an organosilicon compound having at least two mercapto groups per molecule and it can be an organosilane or an organopolysiloxane compound. The molecular structure and the position at which the mercapto group is bonded to the silicon atom are not particularly limitative and the molecular configuration of the compound, when it is an organopolysiloxane, is also not limitative including linear chains, branched chains and cyclic ones. The terminal groups in such an organopolysiloxane may be a trihydrocarbylsilyl group such as trimethylsilyl group, dihydrocarbyl hydroxysilyl group and an organosilyl group having a mercapto-substituted hydrocarbyl group such as 3-mercaptopropyl dimethylsilyl group. At any rate, the mercapto group is preferably bonded to the silicon atom through a hydrocarbon group as in the groups expressed by the formulas —Si-(-CH$_2$-)$_a$SH, a being an integer of 1, 2 or 3, and

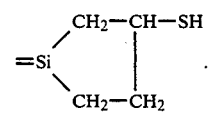

When the organopolysiloxane as the component (B) contains organic groups other than the mercapto-substituted groups as exemplified above bonded to the silicon atoms, they are preferably selected from the class consisting of methyl, ethyl, propyl, phenyl and 3,3,3-trifluoropropyl groups though not limited thereto. The position or arrangement of these groups relative to the mercapto-substituted groups is not particularly limitative in a molecule of the organopolysiloxane. The viscosity of the component (B) should preferably be 10,000 centistokes or lower at 25° C. and adequately selected in consideration of the workability of the resultant organopolysiloxane composition.

The organopolysiloxane composition of the present invention is prepared by uniformly blending the above described components (A) and (B). The blending proportion of these components should preferably be in such a range that the molar ratio of the aliphatically unsaturated groups of the formula $CH_2=CR^2$— in the component (A) to the mercapto groups in the component (B) is in the range from 1:100 to 100:1 or, more preferably, in the range from 2:1 to 1:2.

When the inventive organopolysiloxane composition comprising the components (A) and (B) is irradiated with ultraviolet light or electron beams, an addition reaction takes place between the aliphatically unsaturated groups in the component (A) and the mercapto groups in the component (B) to form crosslinks in the composition. The state of curing thus obtained is so complete even with an outstandingly low dose of irradiation that no or little migration of the silicone constituents takes place between the surface of the thus cured organopolysiloxane composition and the surface of a body in contact therewith.

The curing of the radiation-curable organopolysiloxane composition of the invention is further accelerated when the composition is admixed with a small amount of a photosensitizer. Various types of photosensitizers are effective for the purpose including aromatic carbonyl compounds and azo compounds such as acetophenone, propiophenone, benzophenone, 4-ethylbenzophenone, 4-trimethylsiloxy benzophenone, xanthone, fluorenone, benzaldehyde, anthraquinone, carbazol, benzoin methyl ether, benzoin ethyl ether, benzoin isobutyl ether, azobisisobutyronitrile and the like. The amount of the photosensitizer in the inventive composition should be determined in consideration of the desired curing velocity and the amount is usually in the range from 0.01 to 20% by weight or, preferably, from 0.1 to 5% by weight based on the total amount of the composition.

It is of course optional that the inventive organopolysiloxane composition is further admixed with various kinds of additives conventionally used in similar compositions including stabilizers, e.g. antioxidants, coloring agents, fillers and the like. The composition may be diluted with a suitable organic solvent when it is desired to decrease the consistency of the composition to facilitate application of the composition on to the surface of various substrate materials such as woods, papers, plastics, ceramics and metals. When the coating film of the inventive composition is irradiated with actinic rays such as ultraviolet light, electron beams and the like, the coating film is readily cured by the crosslinking reaction between the components to give a fully cured coating film having a sufficiently high hardness along with releasability, water-repellency, electric insulation and weathering resistance so that the inventive composition is useful, for example, as a surface-releasing agent on the temporary backing paper for adhesive tapes.

In the following, the inventive organopolysiloxane composition is described in more detail by way of examples, in which the symbols Me, Ph and Vi each denote methyl, phenyl and vinyl groups, respectively, the "parts" always refers to "parts by weight" and the viscosity data are the values obtained by the measurements at 25° C. The performance of the cured coating films obtained by the radiation-curing of the inventive compositions was evaluated in terms of the peeling resistance, subsequent adhesion and migration of silicone in the procedures described below.

Peeling resistance: an adhesive (Orivain BPS 5127, a product by Toyo Ink Manufacturing Co., Japan) was uniformly applied on to the surface of the cured film of the composition in a coating amount of 30 g/m$^2$ followed by drying at 100° C. for 3 minutes. A laminating paper was applied and bonded thereto by pressing under a roller of 2 kg weight moved once back and forth followed by standing at 25° C. for 20 hours and then the paper was peeled off by pulling at an angle of 180° to measure the force required for peeling which was given in g per 5 cm width of the peeled paper.

Subsequent adhesion: a first piece of an adhesive tape (Nitto Polyester Tape 31B, a product by Nitto Denki Kogyo Co., Japan) was applied and bonded to the surface of the cured coating film of the composition by pressing under a roller of 2 kg weight moved once back and forth followed by aging at 70° C. for 20 hours under a load of 20 g/cm$^2$ and a second piece of the same adhesive tape was applied and bonded to a polytetrafluoroethylene plate in just the same manner as above. Thereafter, each of the tapes was taken by peeling and again applied and bonded to a stainless steel plate in the same manner and the resistance in peeling of the adhesive tape from the stainless steel plate was compared between the first and the second pieces of the adhesive tape to give the results in %.

Migration of silicone: a polyester film of 20 $\mu$m thickness was directly contacted to the surface of the cured coating film of the composition at 70° C. for 24 hours under a load of 20 g/cm$^2$ and then peeled off. Lines were then drawn on the thus obtained polyester film with an organic solution type marking ink by use of a felt pen and the repellency of the film surface to the marking ink was visually examined to give the results given in three ratings of A, B and C according to the following criteria.

A: Almost no repellency was noted on the film surface.
B: The repellency was not strong but clearly noticeable.
C: Repellency was noted all over the film surface.

EXAMPLE 1

An organopolysiloxane composition was prepared by uniformly blending:

(A) 100 parts of an organopolysiloxane having a viscosity of about 3000 centipoise and composed of 94% by moles of dimethylsiloxane units of the formula Me$_2$SiO, 3% by moles of diphenylsiloxane units of the formula Ph$_2$SiO, and 3% by moles of the aliphatically unsaturated sulfur-containing organosiloxane units of the formula Vi—O-(-CH$_2$-)$_2$—S-(-CH$_2$-)$_3$SiMeO with vinyl dimethylsiloxy groups at the molecular chain ends;

(B) 10 parts of a 3-mercaptopropyl-containing organopolysiloxane having a viscosity of about 30 centipoise and composed of 3-mercaptopropyl methyl siloxane units of the formula HS-(-CH$_2$-)$_3$SiMeO; and (C) 5 parts of benzoin isobutyl ether, and the composition was uniformly applied to the surface of a polyethylene-laminated paper in a coating amount of 1.5 g/m$^2$.

The thus coated polyethylene-laminated paper was exposed for 1 second to the ultraviolet light coming from a high-pressure mercury lamp having a linear power output of 160 watts/cm to find that the coating film had been fully cured. The results of the evaluation tests undertaken for this cured coating film were: peeling resistance 150 g/5 cm; subsequent adhesion 87%; and migration of silicone rating A.

For comparison, the same preparation and tests as above were repeated except that the organopolysiloxane of the component (A) was replaced with the same amount of another organopolysiloxane composed of 94% by moles of dimethylsiloxane units, 3% by moles of diphenylsiloxane units and 3% by moles of vinyl methylsiloxane units of the formula ViMeSiO. The results of the evaluation of the cured film were: peeling resistance 140 g/5 cm; subsequent adhesion 70%; and migration of silicone rating B to C.

EXAMPLE 2

The experimental procedure was substantially the same as in Example 1 except that the component (A) was replaced with the same amount of an organopolysiloxane having a viscosity of about 5000 centipoise and composed of the same three kinds of the siloxane units with the molar proportion of 92% by moles, 3% by moles and 5% by moles for the dimethyl siloxane units, diphenyl siloxane units and the same sulfur-containing organosiloxane units, respectively. The results of the evaluation of the cured film of this composition were: peeling resistance 200 g/5 cm; subsequent adhesion 90 %; and migration of silicone rating A.

For comparison, the same experimental procedure as above was repeated excepting the replacement of the aliphatically unsaturated sulfur-containing organosiloxane units with the same molar amount of vinyl methylsiloxane units. The results of the evaluation of the cured film of this comparative composition were: peeling resistance 220 g/5 cm; subsequent adhesion 75 %; and migration of silicone rating B to C.

EXAMPLE 3

An organopolysiloxane composition was prepared by uniformly blending 100 parts of an organopolysiloxane having a viscosity of 3000 centipoise and composed of 95% by moles of dimethylsiloxane units and 5% by moles of the same aliphatically unsaturated sulfur-containing organosiloxane units as in the component (A) in Example 1 with vinyl dimethylsilyl groups at the molecular chain ends with 10 parts and 5 parts of the same components (B) and (C), respectively, as used in Example 1.

Radiation curing of the above prepared composition and evaluation of the cured coating film of the composition were undertaken in the same manner as in Example 1. The results of the evaluation were: peeling resistance 200 g/5 cm; subsequent adhesion 84%; and migration of silicone rating B to A.

For comparison, the same experimental procedure as above was repeated excepting the replacement of the aliphatically unsaturated sulfur-containing organosiloxane units with the same molar content of vinyl methylsiloxane units. The results of the evaluation of the cured film of this comparative composition were: peeling resistance 230 g/5 cm; subsequent adhesion 60%: and migration of silicone rating C.

EXAMPLE 4

The preparation of the organopolysiloxane composition and curing of the coating film of the composition were undertaken in substantially the same manner as in Example 1 except that the terminal groups at the molecular chain ends of the organopolysiloxane as the component (A) were each a group of the formula Vi—O—(CH$_2$)$_2$S—(CH$_2$)$_3$SiMe$_2$O— instead of the vinyl dimethylsiloxy group, the viscosity of the organopolysiloxane being also about 3000 centipoise.

The thus cured coating film of the composition indicated almost no migration of silicone toward the surface in contact therewith.

EXAMPLE 5

The preparation of the organopolysiloxane composition and curing of the coating film of the composition were undertaken in substantially the same manner as in Example 4 except that the terminal groups at the molecular chain ends were each a trimethylsiloxy group in place of the aliphatically unsaturated sulfur-continuing organosiloxy group.

The thus obtained cured film of the organopolysiloxane composition indicated almost no migration of silicone.

EXAMPLE 6

An organopolysiloxane composition was prepared by uniformly blending 100 parts of a diorganopolysiloxane having a viscosity of 3000 centipoise and composed of 94% by moles of dimethylsiloxane units, 3% by moles of diphenylsiloxane units and 3% by moles of the aliphatically unsaturated siloxane units of the formula Vi—CO—O—(CH$_2$)$_3$SiMeO with vinyl dimethylsiloxy groups at the molecular chain ends as the component (A) with 10 parts and 5 parts of the same components (B) and (C), respectively, as used in Example 1. The composition was applied on to a polyethylene-laminated paper in a coating amount of 1.5 g/m$^2$ and irradiated with ultraviolet light under the same conditions as in Example 1 to find that the coating film had been fully cured. The results of the evaluation undertaken for this cured coating film were: peeling resistance 170 g/5 cm; subsequent adhesion 93%; and complete absence of migration of silicone.

For comparison, the preparation and testing of an organopolysiloxane composition were undertaken in just the same manner as above excepting the replacement of the siloxane units of the formula Vi—CO—O—(CH$_2$)$_3$SiMeO with the same molar amount of methyl vinyl siloxane units. The results of the evaluation of the cured coating film of this composition were: peeling resistance 140 g/5 cm; subsequent adhesion 70%; and migration of silicone rating B to C.

EXAMPLE 7

The preparation and radiation-curing followed by testing of an organopolysiloxane composition were undertaken in just the same manner as in Example 1 except that the terminal groups at the molecular chain ends in the diorganopolysiloxane as the component (A) were each an organosiloxy group of the formula Vi—CH$_2$—S—(CH$_2$)$_3$SiMe$_2$O— in place of the vinyl dimethylsiloxy group. The surface of the cured coating film of this composition was quite free from migration of silicone.

EXAMPLE 8

An organopolysiloxane composition was prepared by uniformly blending 100 parts of a diorganopolysiloxane having a viscosity of about 1000 centipoise and composed of 94% by moles of dimethylsiloxane units, 3% by moles of diphenylsiloxane units and 3% by moles of the aliphatically unsaturated siloxane units of the formula Vi—O—(CH$_2$)$_2$S—(—CH$_2$)$_3$SiMeO with vinyl dimethylsiloxy groups at the molecular chain ends as the component (A) and 5 parts of a mercapto-containing organopolysiloxane having a viscosity of 30 centipoise and composed of the 3-mercaptopropyl methyl siloxane units as the component (B).

The thus prepared composition was applied on to a polyethylene-laminated paper in a coating amount of 1.0 g/m$^2$ and irradiated with electron beams coming from an electron accelerator manufactured by Energy Science Corp. to receive a radiation dose of 1.5 Mrads and it was found that the coating film of the composition had been fully cured showing absolutely no migration of silicone.

EXAMPLE 9

An organopolysiloxane composition was prepared by uniformly blending 100 parts of a diorganopolysiloxane having a viscosity of about 1000 centipoise and composed of 99% by moles of dimethylsiloxane units and 1% by moles of the aliphatically unsaturated sulfur-containing groups of the formula Vi—O—CH$_2$—(S—CH$_2$)$_3$SiMeO with trimethylsiloxy groups at the molecular chain ends and 5 parts of the same mercapto-containing organopolysiloxane as used in Example 8 as the component (B).

The thus prepared composition was applied on to a kraft paper in a coating amount of 1.0 g/m$^2$ and irradiated with electron beams in just the same manner as in the preceding example to find that the coating film of the composition had been fully cured showing absolutely no migration of silicone.

EXAMPLE 10

An organopolysiloxane composition was prepared by uniformly blending 100 parts of a diorganopolysiloxane having a viscosity of about 1000 centipoise and composed of 99% by moles of dimethylsiloxane units and 1% by moles of the aliphatically unsaturated siloxane units of the formula Vi—CH$_2$—S—(CH$_2$)$_3$SiMeO with vinyl dimethylsiloxy groups at the molecular chain ends and 5 parts of the same mercapto-containing organopolysiloxane as used in Example 8 as the component (B).

The thus prepared composition was applied on to a kraft paper and cured by irradiation with electron beams in just the same manner as in the preceding example to find that the coating film of the composition had been fully cured showing absolutely no migration of silicone.

What is claimed is:

1. A radiation-curable organonpolysiloxane composition which comprises:
    (A) an aliphatic unsaturation-containing organopolysiloxane containing at least two of the organosiloxane units represented by the general unit formula $$(CH_2=CR^2-X-R^1)SiR^3{}_mO_{\frac{3-m}{2}},$$

in which R$^1$ is a divalent hydrocarbon group, R$^2$ is a hydrogen atom or a methyl group, R$^3$ is a substituted or unsubstituted monovalent hydrocarbon group, X is a group selected from the class consisting of —O—(CH$_2$)$_2$S— and —CH$_2$—O—CH$_2$—S—; and m is a number or 0, 1 or 2; and
    (B) an organosilicon compound having at least two mercapto groups —SH per molecule in such an amount as to provide from 0.01 to 100 moles of the mercapto groups per mole of the aliphatically unsaturated group CH$_2$=CR$^2$— in the component (A).

2. The radiation-curable organopolysiloxane composition as claimed in claim 1 wherein the aliphatic unsaturation-containing organopolysiloxane as the component (A) is composed of
    (1) at least two of the organosilioxane units of a first type represented by the general unit formula $$(CH_2=CR^2-X-R^1)SiR^3{}_mO_{\frac{3-m}{2}},$$

in which R$^1$, R$^2$, R$^3$, X and m each have the same meaning as defined above, and
    (2) the organosiloxane units of a second type represented by the general unit formula $$R^3{}_nSiO_{\frac{4-n}{2}},$$

in which R$^3$ has the same meaning as defined above and n is a number of 0, 1, 2 or 3.

3. The radiation-curable organopolysiloxane composition as claimed in claim 2 wherein the organopolysiloxane as the component (A) contains at least 0.1% by moles of the organosiloxane units of the first type based on the total molar amount of the siloxane units.

4. The radiation-curable organopolysiloxane composition as claimed in claim 1 wherein the ratio of the amounts of the components (A) and (B) is in such a range that from 0.5 to 2 moles of the mercapto groups in the component (B) are provided per mole of the aliphatically unsaturated groups in the component (A).

5. The radiation-curable organopolysiloxane composition as claimed in claim 1 which further comprises a photosensitizer.

6. The radiation-curable organopolysiloxane composition as claimed in claim 5 wherein the amount of the photosensitizer is in the range from 0.01 to 20% by weight based on the total amount of the composition.

* * * * *